(12) United States Patent
Higano et al.

(10) Patent No.: US 9,772,528 B2
(45) Date of Patent: Sep. 26, 2017

(54) DISPLAY DEVICE

(71) Applicant: Japan Display Inc., Tokyo (JP)

(72) Inventors: Toshiyuki Higano, Tokyo (JP); Emi Higano, Tokyo (JP)

(73) Assignee: Japan Display Inc., Tokyo (JP)

( * ) Notice: Subject to any disclaimer, the term of this patent is extended or adjusted under 35 U.S.C. 154(b) by 35 days.

(21) Appl. No.: 14/922,770

(22) Filed: Oct. 26, 2015

(65) Prior Publication Data

US 2016/0116808 A1 Apr. 28, 2016

(30) Foreign Application Priority Data

Oct. 27, 2014 (JP) ................. 2014-218448

(51) Int. Cl.
*G02F 1/1333* (2006.01)
*G02F 1/1343* (2006.01)
*G02F 1/1335* (2006.01)
*G02F 1/1362* (2006.01)

(52) U.S. Cl.
CPC .. *G02F 1/134309* (2013.01); *G02F 1/133512* (2013.01); *G02F 1/136286* (2013.01); *G02F 2001/134345* (2013.01)

(58) Field of Classification Search
CPC ......... G02F 1/134308; G02F 1/133512; G02F 1/136286; G02F 2001/134345; G02F 1/134363; G02F 1/133514; G02F 1/136209
USPC ................. 349/106, 144, 145, 146
See application file for complete search history.

(56) References Cited

U.S. PATENT DOCUMENTS

| | | | | |
|---|---|---|---|---|
| 6,989,876 B2 * | 1/2006 | Song | ................. | G02F 1/133514 349/106 |
| 7,362,393 B2 * | 4/2008 | Kim | .................. | G02F 1/133514 349/106 |
| 2003/0038910 A1 * | 2/2003 | Nagano | ............. | G02F 1/136209 349/113 |
| 2005/0068477 A1 * | 3/2005 | Shin | .................. | G02F 1/133514 349/106 |
| 2005/0168678 A1 * | 8/2005 | Andou | ............. | G02F 1/133514 349/145 |
| 2007/0064162 A1 | 3/2007 | Yamamoto et al. | | |
| 2008/0084376 A1 * | 4/2008 | Hirota | .................. | G09G 3/3607 345/88 |
| 2010/0002162 A1 * | 1/2010 | Morimoto | ......... | G02F 1/134363 349/38 |

(Continued)

FOREIGN PATENT DOCUMENTS

JP 2007010753 A 1/2007

*Primary Examiner* — Edward Glick
*Assistant Examiner* — David Chung
(74) *Attorney, Agent, or Firm* — Typha IP LLC (57) ABSTRACT

A display device includes a first pixel formed by a red sub pixel, a green sub pixel, and a white sub pixel and a second pixel formed by a red sub pixel, a green sub pixel, and a blue sub pixel. The red sub pixel and the green sub pixel are arranged in a second direction. The white sub pixel is arranged adjacently to the red sub pixel and the green sub pixel in a first direction. The blue sub pixel is adjacently to the red sub pixel and the green sub pixel in the first direction. A light shielding wiring layer extending in the first direction is arranged between the red sub pixel and the green sub pixel of each of the first pixel and the second pixel.

3 Claims, 11 Drawing Sheets

(56) References Cited

U.S. PATENT DOCUMENTS

| | | | | |
|---|---|---|---|---|
| 2011/0187953 A1* | 8/2011 | Hiyama | ............ | G02F 1/136 |
| | | | | 349/42 |
| 2011/0234949 A1* | 9/2011 | Matsui | ............ | G02F 1/133512 |
| | | | | 349/106 |
| 2013/0256707 A1* | 10/2013 | Chiang | ............ | H01L 33/08 |
| | | | | 257/88 |
| 2013/0271676 A1* | 10/2013 | Kim | ............ | G02B 27/22 |
| | | | | 349/15 |
| 2015/0185576 A1* | 7/2015 | Chu | ............ | G02F 1/136286 |
| | | | | 349/43 |

* cited by examiner

$L_W = L_R + W_2 + L_G$
$L_B = L_R + W_4 + L_G$
$0 \leq W_2 (W_4) < W_1 (W_3, W_5)$

$L_W = L_B = L_R + W_2 + L_G$, $L_R = L_G$, $W_3 = W_5 = W_1$, $W_4 = W_2$,
$W_8 = W_6$, $0 \leq W_2 < W_1$, $W_6 < W_7$, $W_{RG} = W_{WB}$

$L_W = L_B = L_R + W_2 + L_G$, $L_R = L_G$, $W_3 = W_5 = W_1$,
$W_8 = W_6$, $0 \leq W_2 < W_1$, $W_6 < W_7$, $W_{RG} = W_{WB}$

DISPLAY DEVICE

CLAIM OF PRIORITY

The present application claims priority from Japanese patent application JP2014-218448 filed on Oct. 27, 2014, the content of which is hereby incorporated by reference into this application.

BACKGROUND

This disclosure relates to a display device and is applicable to a display device, for example, of RGBW method.

White display brightness in a liquid crystal display is determined by the brightness of a backlight and the transmittance of liquid crystals. As an improvement in the brightness of a backlight increases power consumption, it is preferable to improve the transmittance of the liquid crystals. As a method of actually improving the white brightness and realizing a white peak display while improving the transmittance of the liquid crystals, for example, there is an example of using a pixel of white color in addition to the three primary colors of red, green, and blue, for the improvement in the transmittance property, without increasing the power consumption, as described in Japanese Patent Publication Laid-Open No. 2007-010753. That is to say, the display device is formed by a pixel group including four sub pixels of red, green, blue, and white.

SUMMARY

The inventor et al. found the following problem while considering a display device of RGBW method in which, of red sub pixel (hereinafter, abbreviated as "R"), green sub pixel (hereinafter, abbreviated as "G", and blue sub pixel (hereinafter, abbreviated as "B"), a half number of the B is replaced with white sub pixel (hereinafter, abbreviated as "W").

The problem is that the respective aperture ratios of R and G get lower than the respective aperture ratios of B and W.

Other problems and novel features will be apparent from the description of the disclosure and the accompanying drawings.

The outline of the typical one of the disclosure is briefly described as follows.

A display device includes an array substrate, an opposite substrate, and a liquid crystal layer sandwiched by the array substrate and the opposite substrate. The array substrate includes a first pixel formed by a red sub pixel, a green sub pixel, and a white sub pixel, a second pixel formed by a red sub pixel, a green sub pixel, and a blue sub pixel, a gate line extending in a first direction, and a signal line extending in a second direction. The red sub pixel and the green sub pixel of the first pixel are arranged in the second direction, and the white sub pixel of the first pixel is arranged adjacently to the red sub pixel and the green sub pixel in the first direction. The red sub pixel and the green sub pixel of the second pixel are arranged in the second direction, and the blue sub pixel of the second pixel is arranged adjacently to the red sub pixel and the green sub pixel in the first direction. A first light shielding wiring layer extending in the first direction is arranged between the red sub pixel and the green sub pixel of the first pixel. A second light shielding wiring layer extending in the first direction is arranged between the red sub pixel and the green sub pixel of the second pixel.

DESCRIPTION OF THE PREFERRED EMBODIMENTS

Hereinafter, embodiment, example, and modified example will be described with reference to the drawings. The disclosure is only one example and it is understood that various changes that would be easily conceived by those skilled in the art, within the spirit of the invention, will be naturally contained in the scope of the invention. The width, thickness, and shape of each unit may be sometimes represented more schematically compared to the actual form to make the description clearer; however, they are only one example and not to restrict the interpretation of the invention. The same codes are attached to the same elements having been described in the previous drawing and their detailed description is properly omitted.

<Pixel Arrangement of RGBW Method>

Figure 1:
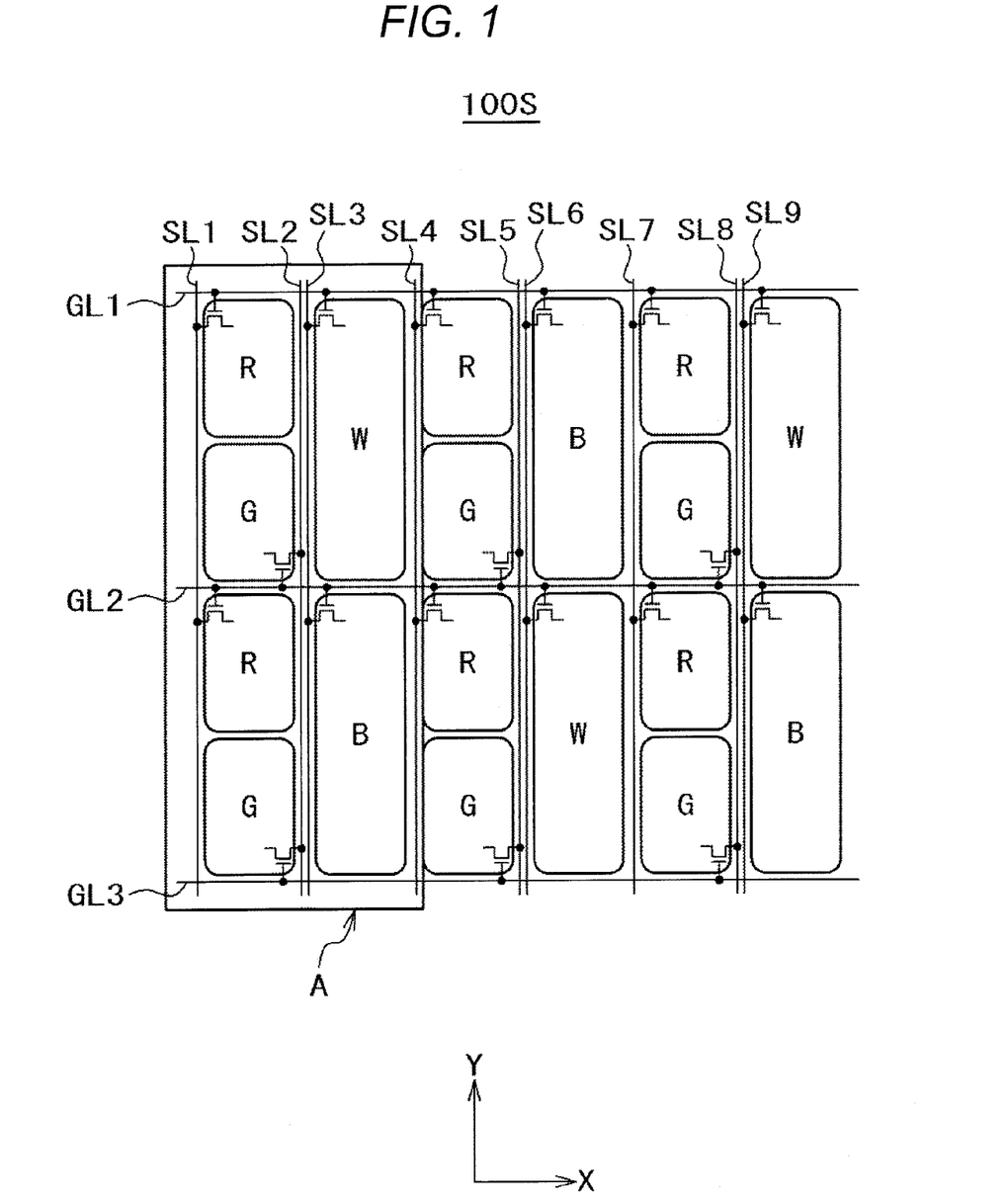
FIG. 1 is a top plan view for use in describing a display device of the RGBW method.

At first, the pixel arrangement of the RGB method examined by the inventor et al. (hereinafter, simply referred to as "RGBW method") will be descried using FIG. 1. FIG. 1 is a top plan view illustrating the pixel arrangement of the display device of the RGBW method.

As illustrated in FIG. 1, the display device 100S of the RGBW method includes a first pixel formed by R, G, and W and a second pixel formed by R, G, and B. By adding the sub pixels W to improve the transmittance, the display device 100S has the W substituted for half of the B. The respective opening areas of the G and the R are defined as about half of the respective opening areas of the B and the W. The first pixel has the R and the G adjacently arranged in the Y direction and the R, G and the W adjacently arranged in the X direction. The second pixel has the R and the G adjacently arranged in the Y direction and the R, G and the B adjacently arranged in the X direction. The first pixel and the second pixel are alternately arranged in the X direction and the first pixel and the second pixel are alternately arranged in the Y direction.

The R, G, B and W respectively include thin film transistors (TFT) connected to the scanning lines (gate lines) and the signal lines (source lines). The scanning line is connected to the gate electrode of TFT and the signal line is connected to the source electrode of TFT. Here, the signal line is also referred to as a drain line in some cases and the electrode of TFT connected to the drain line is referred to as a drain electrode.

Scanning lines GL1, GL2, and GL3 extend in the X direction. The R and W of the first pixel arranged between the scanning line GL1 and the scanning line GL2 are connected to the scanning line GL1, and the G thereof is connected to the scanning line GL2. The R and B of the second pixel arranged between the scanning line GL1 and the scanning line GL2 are connected to the scanning line GL1 and the G thereof is connected to the scanning line GL2. In other words, the sub pixel G of the first pixel and the sub pixel R of the second pixel that are adjacent to each other with the scanning line GL2 interposed therebetween, are connected to the scanning line GL2. Further, the G of the second pixel and the R of the first pixel that are adjacent to each other with the scanning line GL2 interposed therebetween, are connected to the scanning line GL2. The W of the first pixel is connected to the scanning line GL1 and the B of the second pixel is connected to the scanning line GL2, both being adjacent to each other with the scanning line GL2 interposed therebetween. In other words, the G and R adjacent to each other in the Y direction are connected to the same scanning line and the W and B adjacent to each other in the Y direction are connected to the different scanning line.

The signal lines SL1 to SL9 extend in the Y direction. The R is connected to the signal line SL1, the G is connected to the signal line SL2, and the W and the B are connected to the signal line SL3. The R and G are arranged between the signal line SL1 and the signal line SL2 and the W and B are arranged between the signal line SL3 and the signal line SL4. In other words, the R arranged between the signal line SL1 and the signal line SL2 is connected to the signal line SL1 and the G arranged between the signal line SL1 and the signal line SL2 is connected to the signal line SL2. The W and B arranged between the signal line SL3 and the signal line SL4 are connected to the signal line SL3. No sub pixel is arranged between the signal line SL2 and the signal line SL3. That is to say, between some sub pixels, there is one signal line and between other sub pixels, there are two signal lines.

Other than the arrangement of the sub pixels and the signal lines (first signal line arrangement method) as illustrated in FIG. 1, the R and G may be arranged between the signal line SL1 and the signal line SL2 and the W and B may be arranged between the signal line SL2 and the signal line SL3 (second signal line arrangement method). Alternatively, either the first pixel or the second pixel may be arranged in the X direction and the first pixel and the second pixel may be alternately arranged in the Y direction.

<Problem of Pixel Arrangement of RGBW Method>

Figure 2:
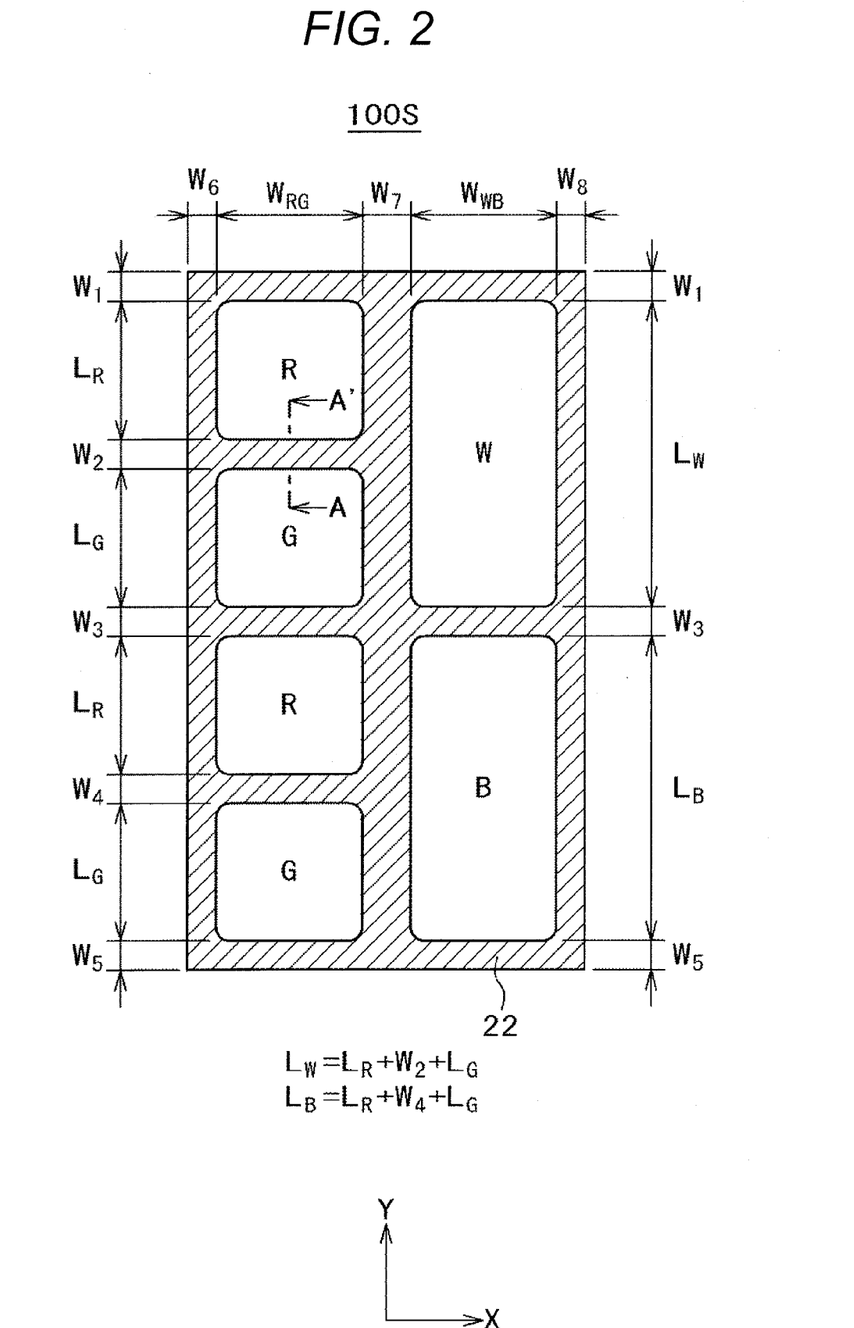
FIG. 2 is a top plan view for use in describing the object of the display device of the RGBW method.
Figure 3:
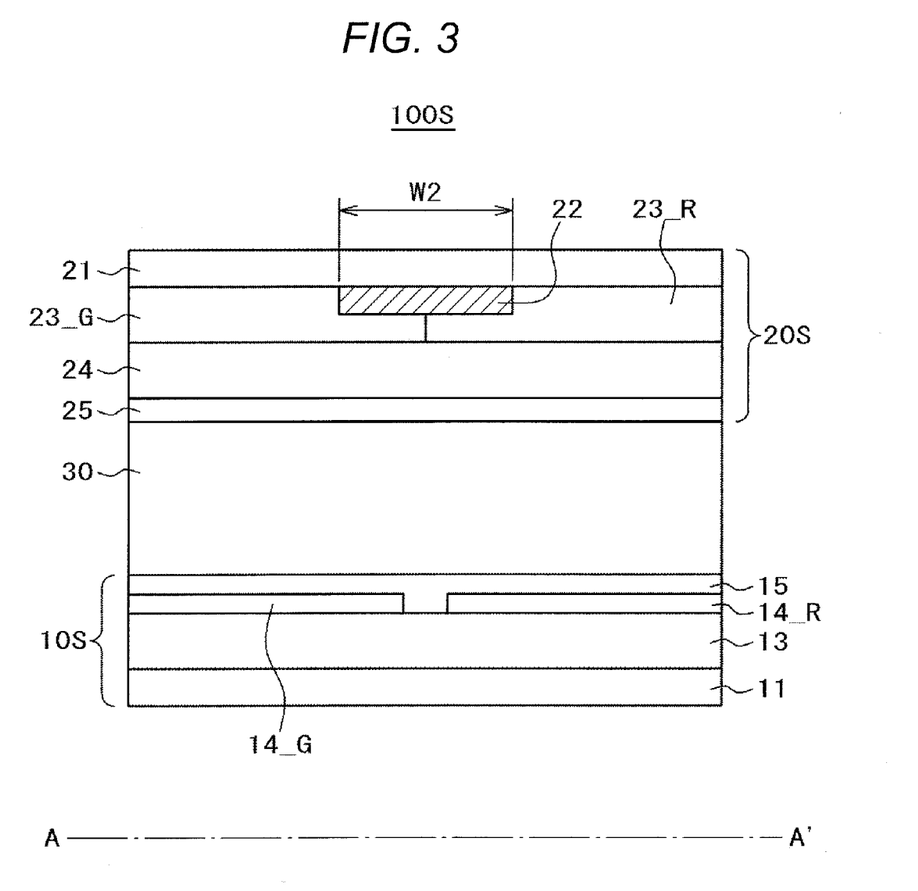
FIG. 3 is a cross-sectional view for use in describing the object of the display device of the RGBW method.

Next, a problem of the display device of the RGBW method will be described using FIGS. 2 and 3. FIG. 2 is a top plan view illustrating an aperture pattern of sub pixels corresponding to the portion A of FIG. 1. FIG. 3 is a cross-sectional view taken along the line A-A' of FIG. 2.

In the pixel arrangement illustrated in FIG. 1, any scanning line and TFT do not have to be arranged in each space between the R and G of the first pixel and the second pixel and therefore, the space between R and G can be narrowed. In order to prevent a color mixture from a slated visual field, however, a black matrix (light shielding layer) having the same width has to be arranged there as that of the space between the other sub pixels where the scanning lines and TFTs are arranged, as illustrated in FIG. 2. When each width of the R and G (the length in the X direction) is defined as the same width as each of the B and W, each aperture ratio of the R and G gets lower than each of the B and W. This point will be hereinafter described using FIG. 2.

Although the aperture shape of each sub pixel is actually a rounded rectangle (rectangular shape with four rounded corners), it is regarded as a square. The length of the R is defined as $L_R$ and the width thereof is defined as $W_{RG}$; the length of the G is defined as $L_G$ and the width thereof is defined as $W_{RG}$; the length of the W is defined as $L_W$ and the width thereof is defined as $W_{WB}$; and the length of the B is defined as $L_B$ and the width thereof is defined as $W_{WB}$. Further, when the aperture area of the R is defined as $S_R$, the aperture area of the G is defined as $S_G$, the aperture area of the W is defined as $S_W$, and the aperture area of the B is defined as $S_B$, the following relational expressions (1) to (4) are satisfied.

$$S_R = L_R \times W_{RG} \quad (1)$$

$$S_G = L_G \times W_{RG} \quad (2)$$

$$S_W = L_W \times W_{WB} \quad (3)$$

$$S_B = L_B \times W_{WB} \quad (4)$$

When the width of the black matrix 22 between the R and G of the first pixel is defined as $W_2$ and the width of the black matrix 22 between the R and G of the second pixel is defined as $W_4$, the following relational expressions (5) and (6) are satisfied. The width of the black matrix 22 on the scanning line GL1 connected to the R and W of the first pixel is defined as $W_1$, the width of the black matrix 22 between the first pixel and the second pixel is defined as $W_3$, and the width of the black matrix 22 on the scanning line GL3 connected to the G of the second pixel is defined as $W_5$.

$$L_W = L_R + W_2 + L_G \quad (5)$$

$$L_E = L_R + W_4 + L_G \quad (6)$$

Here, when $W_{RG} = W_{WB}$, according to the expressions (1), (2), (3), and (5),
the following expression is satisfied;

$$S_R + S_G = S_W - W_2 \times W_{RG} \quad (7)$$

and according to the expressions (1), (2), (4), and (6),
the following expression is satisfied;

$$S_R + S_G = S_B - W_4 \times W_{RG} \quad (8).$$

When the both sides of the expressions (7) and (8) are added together,
the following expression is satisfied;

$$2S_R + 2S_G = S_W + S_B - (W_2 + W_4) \times W_{RG} \quad (9).$$

The expression (9) indicates that the total of the aperture areas of the R and the aperture areas of the G of the first pixel and the second pixel gets smaller than the total of the aperture area of the W and the aperture area of the B by the area for the black matrix between the R and G. When $L_R = L_G$ and $W_2 = W_4$, or $S_R = S_G$ and $S_W = S_B$,
the following expression is satisfied;

$$S_R = S_G = (S_W - W_2 \times W_{RG})/2 = (S_B - W_2 \times W_{RG})/2 \quad (10).$$

Taking the assembly deviation of the array substrate and the opposite substrate into consideration, in order to prevent a color mixture, the width $W_2$ has to be almost equal to the width $W_1$ ($W_2 \cong W_1$), and the equation $W_2 = 0$ is impossible. The aperture area of the R and the aperture area of the G are smaller than half of the aperture area of the W or the aperture area of the B by half of the area for the black matrix between the R and G. Therefore, the aperture ratios of the R and G are lower than the aperture ratios of the B and W.

When the width of the black matrix 22 between the W(B) and the R and G where one signal line SL1 is arranged is defined as $W_6$, the width of the black matrix 22 between the R and G and the W(B) where two signal lines SL2 and SL3 are arranged is defined as $W_7$, and the width of the black matrix 22 between the W(B) and the R and G where one signal line SL4 is defined as $W_8$, $W_7 > W_6$ and $W_7 > W_8$. Here, the equation $W_6 = W_8$ is possible.

As illustrated in FIG. 3, a display device 100S includes an array substrate 10S, an opposite substrate 20S, and a liquid crystal layer 30. The array substrate 10S includes a glass substrate 11, an interlayer film 13, a pixel electrode 14_R for R, a pixel electrode 14_G for G, and an alignment film 15. The opposite substrate 20 includes a glass substrate 21, a black matrix 22, a color filter (colored layer) 23_R for R, a color filter 23_G for G, a flattening film 24, and an alignment film 25. In the vicinity of the boundary of the R and G, any light shielding layer (metal wiring) other than the black matrix 22 is not arranged.

Embodiment

Figure 4:
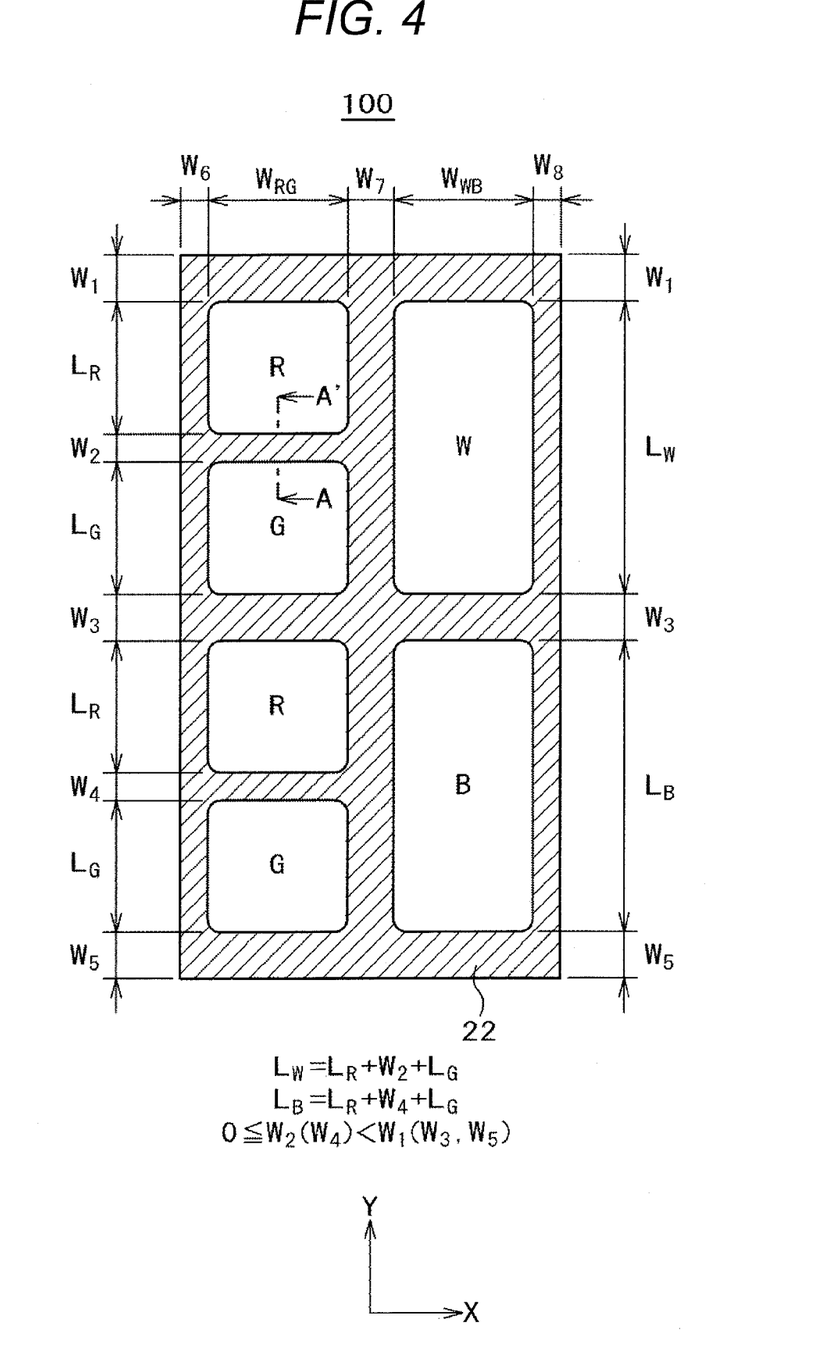
FIG. 4 is a top plan view for use in describing the display device according to an embodiment.
Figure 5:
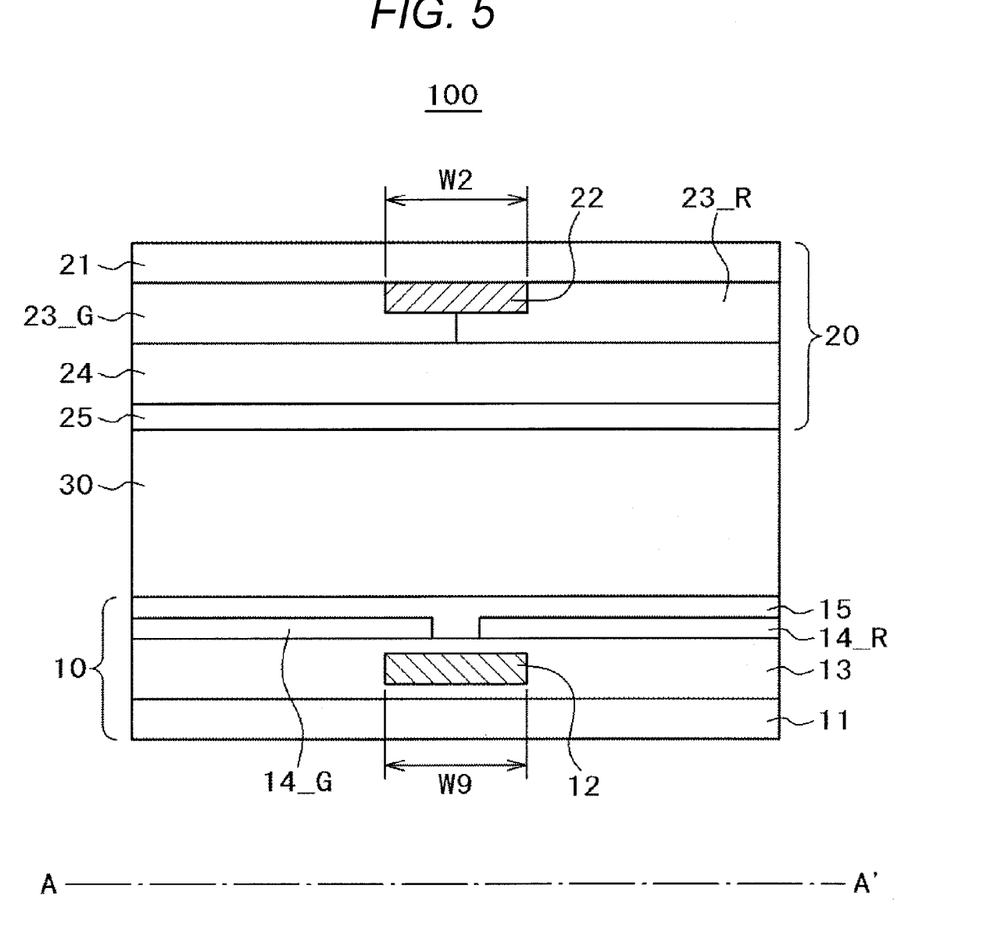
FIG. 5 is a cross-sectional view for use in describing the display device according to the embodiment.

A display device according to an embodiment will be described using FIGS. 4 and 5. FIG. 4 is a view illustrating the aperture pattern of sub pixels in the display device according to the embodiment. FIG. 5 is a cross-sectional view taken along the line A-A' of FIG. 4.

The arrangement of pixels (sub pixels), scanning lines, and signal lines in a display device 100 according to the embodiment is similar to the display device 100S according to the comparison example. However, in the display device 100, a light shielding layer besides the black matrix 22 is arranged in the vicinity of the boundary of the R and G, differently from the display device 100S and the width of the black matrix 22 is different from that of the display device 100S.

As illustrated in FIG. 5, the display device 100 includes an array substrate 10, an opposite substrate 20, and a liquid crystal layer 30. The array substrate 10 includes a glass substrate 11, an interlayer film 13, a pixel electrode 14_R for R, a pixel electrode 14_G for G, and an alignment film 15. The opposite substrate 20 includes a glass substrate 21, a black matrix 22, a color filter 23_R for R, a color filter 23_G for G, a flattening film 24, and an alignment film 25. A light shielding layer 12 is arranged between the glass substrate 11 and the alignment film 15 in the vicinity of the boundary of the R and G in the array substrate 10. The light shielding layer 12 may be the same layer as the signal line or may be a different layer from the signal line (upper layer or lower layer). From a viewpoint of color mixture prevention, the light shielding layer 12 should be preferably as close to the liquid crystal layer 30 as possible. As the light shielding layer 12 is arranged in the array substrate 10, the width ($W_2$ and $W_4$) of the black matrix 22 between the color filter (colored layer) 23_R for R and the color filter 23_G for G can be narrower than each width of $W_1$, $W_3$, and $W_5$. There is no need to arrange the black matrix 22 between the color filter 23_R for R and the color filter 23_G for G ($W_2=0$, $W_4=0$). The width ($W_9$) of the light shielding layer 12 is narrower than each width of $W_1$, $W_3$, and $W_5$.

As the width of $W_2$ and $W_4$ in the display device 100 can be formed narrower than the width of $W_2$ and $W_4$ in the display device 100S according to the comparison example, the aperture area of the R ($S_R$) and the aperture area of the G ($S_G$) in the display device 100 can be enlarged more than the aperture area of the R ($S_R$) and the aperture area of the G ($S_G$) in the display device 100S, according to the expressions (9) and (10).

In the following example, a case of using the signal line for a light shielding layer will be described; however, it is not restricted thereto and needless to say, a scanning line formed in a different layer from the signal line or metal wiring such as auxiliary wiring can be applied to a light shielding layer.

EXAMPLE

Figure 6:
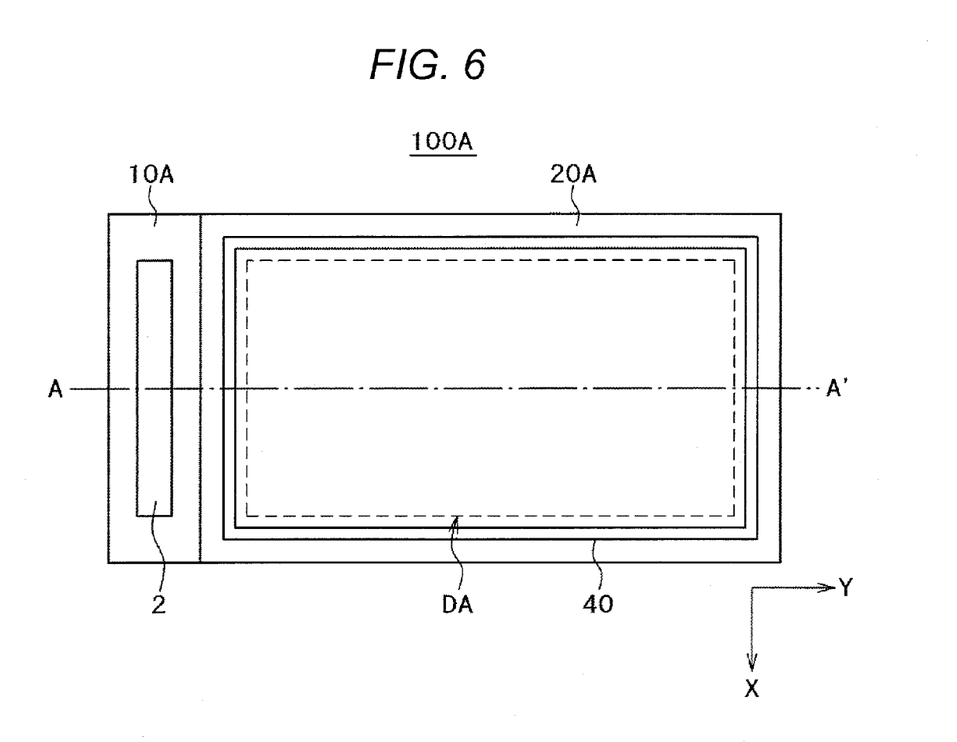
FIG. 6 is a top plan view for use in describing the display device according to the embodiment.
Figure 7:
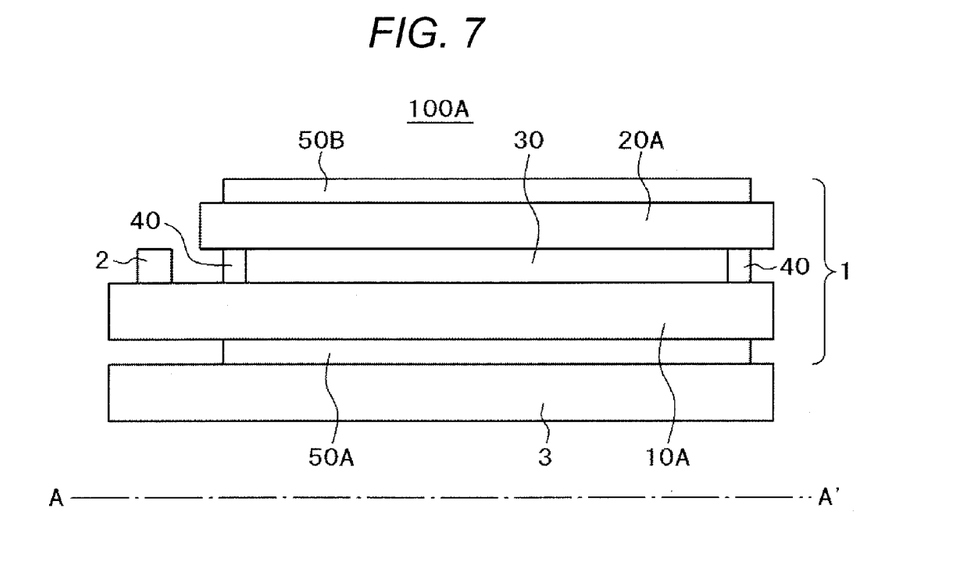
FIG. 7 is a cross-sectional view for use in describing the display device according to the embodiment.
Figure 8:
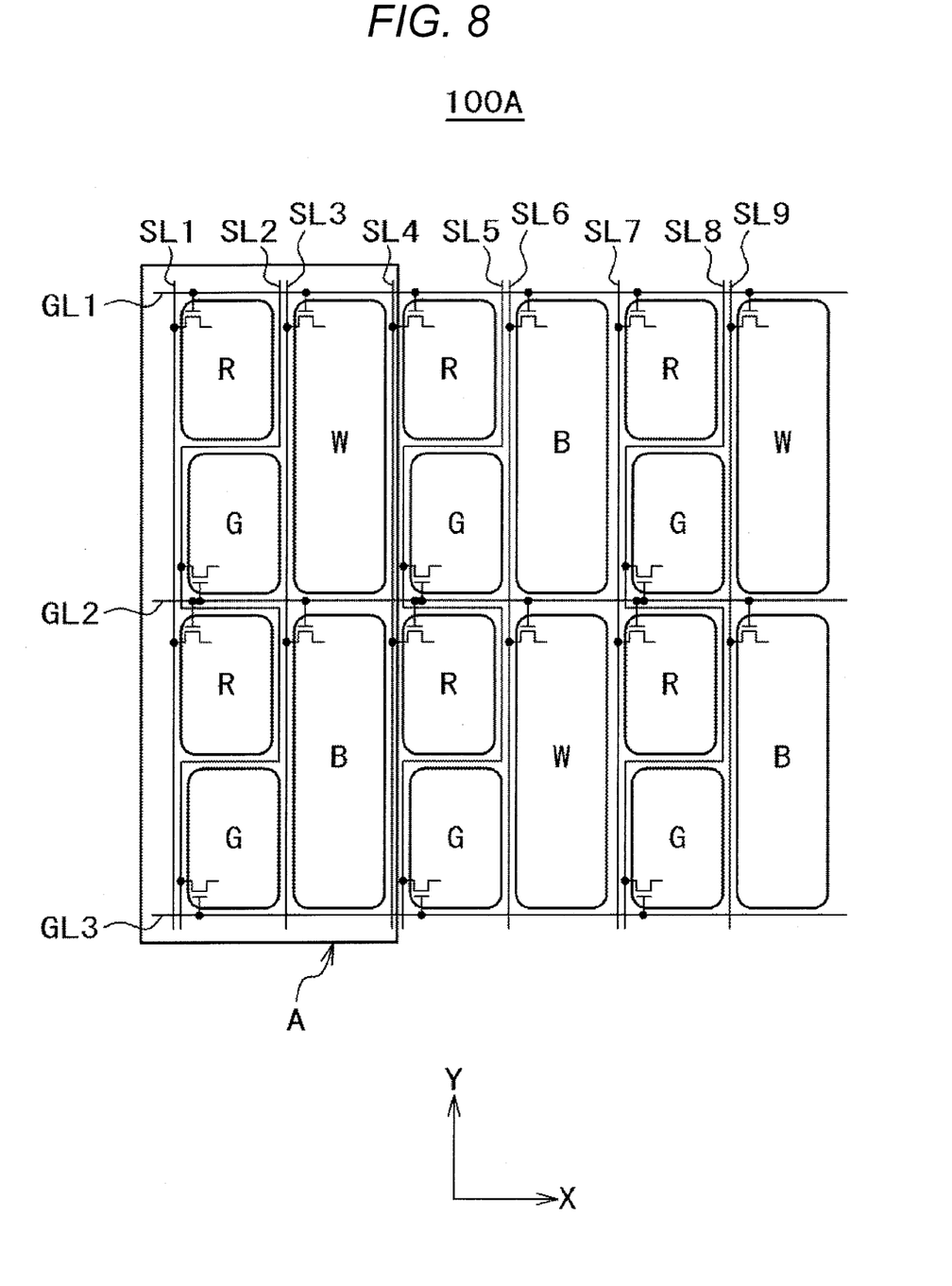
FIG. 8 is a top plan view for use in describing the display device according to the embodiment.
Figure 9:
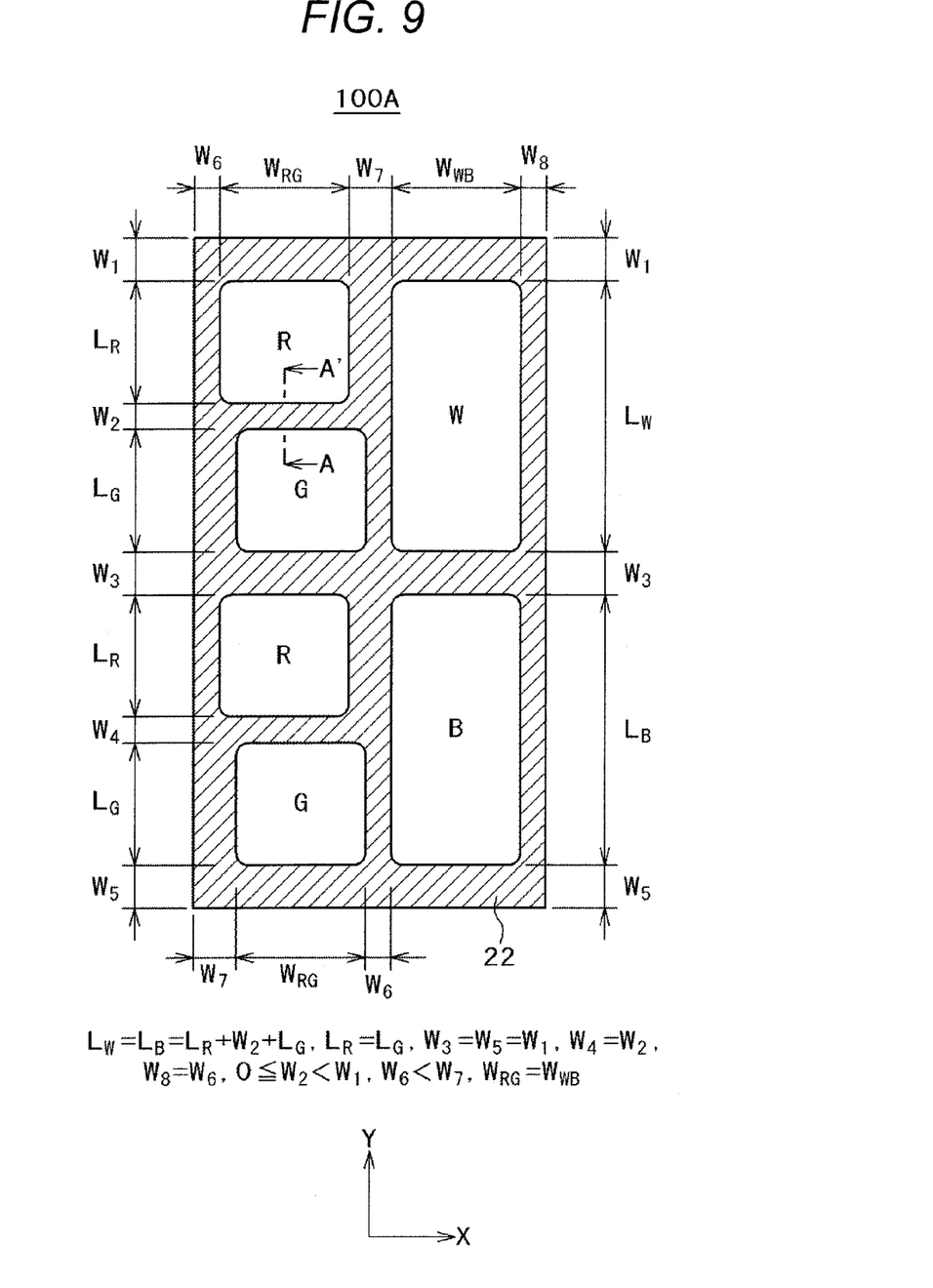
FIG. 9 is a top plan view for use in describing the display device according to the embodiment.
Figure 10:
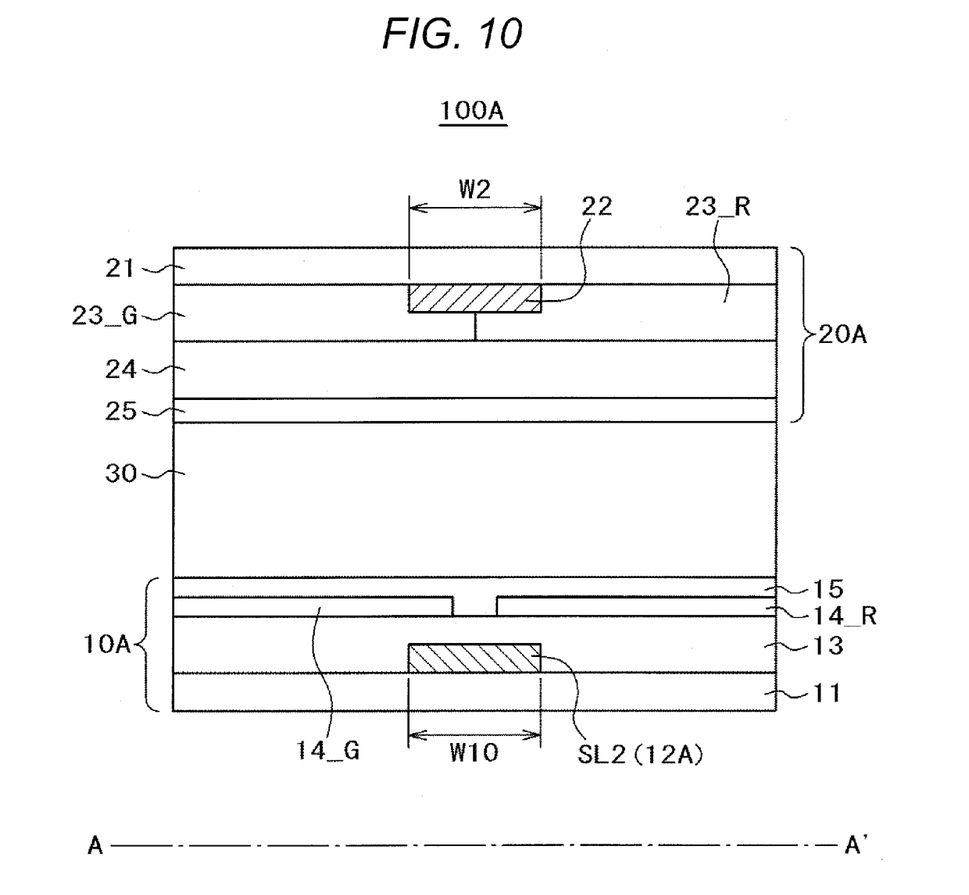
FIG. 10 is a cross-sectional view for use in describing the display device according to the embodiment.

A display device according to an example will be described using FIGS. 6 to 10. FIG. 6 is a top plan view of the whole display device according to the example. FIG. 7 is a cross-sectional view taken along the line A-A' of FIG. 6. FIG. 8 is a top plan view for use in describing the arrangement of pixels, scanning lines, and signal lines in the display device according to the example. FIG. 9 is a top plan view illustrating an aperture pattern of sub pixels corresponding to the portion A of FIG. 8. FIG. 10 is a cross-sectional view taken along the line A-A' of FIG. 8.

As illustrated in FIGS. 6 and 7, a display device 100A according to the example includes a display panel 1, a driver IC 2, and a backlight 3. The display panel 1 includes an array substrate 10A, an opposite substrate 20A, and a liquid crystal material 30 sealed between the array substrate 10A and the opposite substrate 20A. The array substrate 10A and the opposite substrate 20A are adhered to each other with a ring-shaped sealing material 40 surrounding a display area DA, and the liquid crystal material 30 is sealed into a space surrounded by the array substrate 10A, the opposite substrate 20A, and the sealing material 40. Further, a lower polarizing plate 50A and an upper polarizing plate 50B are respectively arranged on the outer surfaces of the array substrate 10A and the opposite substrate 20A, in other words, on the rear surfaces thereof opposite to the liquid crystal material 30. The display area DA is formed, for example, by a group of plural pixels arranged in a matrix shape. The array substrate 10A includes a scanning circuit for driving scanning lines formed by TFTs not illustrated. The driver IC 2 includes a circuit for driving signal lines not illustrated.

As illustrated in FIG. 8, although the arrangement of the pixels and the scanning lines in the display device 100A is the same as that in the display device 100S, the arrangement of the signal lines is different. In the display device 100A, the R is connected to the signal line SL1, the G is connected to the signal line SL2, and the W and B are connected to the signal line SL3, similarly to the display device 100S. The R is arranged between the signal line SL1 and the signal line SL2, the G is arranged between the signal line SL2 and the signal line SL3, and the W and B are arranged between the signal line SL3 and the signal line SL4. In other words, when the signal line SL2 is adjacent to the R, the signal line SL2 is arranged between the R and the signal line SL3. When the signal line SL2 is adjacent to the G, the signal line SL2 is arranged between the signal line SL1 and the G. Further, the signal line SL2 is also arranged between the R and G, extending in a zigzag shape. The signal lines SL5 and SL8 are arranged similarly to the signal line SL2. There is one signal line arranged between some sub pixels and there are two signal lines between other sub pixels, similarly to the display device 100S.

The width of the black matrix 22 between the R and G of the first pixel and the width of the black matrix 22 between the R and G of the second pixel are defined as $W_2$ ($W_4=W_2$).

The width of the black matrix 22 on the scanning line GL1 connected to R and W of the first pixel, the width of the black matrix 22 between the first pixel and the second pixel, and the width of the black matrix 22 on the scanning line GL3 connected to G of the second pixel are defined as $W_1$ ($W_3=W_5=W_1$). Here, $W_2<W_1$. For example, $W_2=3$ μm and $W_1=9$ μm.

The width of the black matrix 22 between the B(W) and R where one signal line SL1 is arranged is defined as $W_6$, the width of the black matrix 22 between the W(B) and G where two signal lines SL1 and SL2 are arranged is defined as $W_7$, the width of the black matrix 22 between the R and W(B) where two signal lines SL2 and SL3 are arranged is defined as $W_7$, the width of the black matrix 22 between the G and W(B) where one signal line SL3 is arranged is defined as $W_6$, and the width of the black matrix 22 between the W(B) and R where one signal line SL4 is arranged is defined as $W_6$ ($W_8=W_6$). Here, $W_7>W_6$. For example, $W_6=3$ μm and $W_7=5$ μm. In other words, the width of the black matrix 22 where two signal lines are arranged between the sub pixels is defined as $W_7$ and the width of the black matrix 22 where one signal line is arranged between the sub pixels is defined as $W_6$. Therefore, the width of the G is equal to the width of the R. Further, the aperture of the G is closer to the aperture of the W and B than the aperture of the R.

As illustrated in FIG. 10, the display device 100A includes the array substrate 10A, the opposite substrate 20A, and the liquid crystal layer 30. The array substrate 10A includes a glass substrate 11, an interlayer film 13, a pixel electrode 14_R for R, a pixel electrode 14_G for G, and an alignment film 15. The opposite substrate 20A includes a glass substrate 21, a black matrix 22, a color filter 23_R for R, a color filter 23_G for G, a flatterning film 24, and an alignment film 25. A wiring layer 12A of the signal line SL2 that is a light shielding layer is arranged in the vicinity of the boundary of the R and G in the array substrate 10A. As the wiring layer 12A is arranged in the array substrate 10A, the width ($W_2$) of the black matrix 22 between the color filter 23_R for R and the color filter 23_G for G can be narrower than the width $W_1$. There is no need to arrange the black matrix 22 between the color filter 23_R for R and the color filter 23_G for G ($W_2=0$). The width ($W_{10}$) of the wiring layer 12A is narrower than the width $W_1$.

Other than the arrangement of the sub pixels and the signal lines as illustrated in FIG. 8 (third signal line arrangement method), the following arrangements of the sub pixels and the signal lines (fourth, fifth, and sixth signal line arrangement methods) may be applied.

(a) Fourth Signal Line Arrangement Method

The sub pixel G is arranged between the signal line SL1 and the signal line SL2, the R is arranged between the signal line SL2 and the signal line SL3, and the W and B are arranged between the signal line SL3 and the signal line SL4. In other words, when the signal line SL2 is adjacent to the G, the signal line SL2 is arranged between the G and the signal line SL3. When the signal line SL2 is adjacent to the R, the signal line SL2 is arranged between the signal line SL1 and the R. Further, the signal line SL2 is arranged between the R and G, extending in a zigzag shape. The signal lines SL5 and SL8 are arranged similarly to the signal line SL2.

(b) Fifth Signal Line Arrangement Method

The sub pixel R is arranged between the signal line SL1 and the signal line SL2, the G is arranged between the signal line SL2 and the W(B), and the signal line SL3 is arranged between the W(B) and the signal line SL4. In other words, when the signal line SL2 is adjacent to the R, the signal line SL2 is arranged between the R and W(B). When the signal line SL2 is adjacent to the G, the signal line SL2 is arranged between the signal line SL1 and the G. Further, the signal line SL2 is arranged between the R and G, extending in a zigzag shape. The signal lines SL5 and SL8 are arranged similarly to the signal line SL2.

(c) Sixth Signal Line Arrangement Method

The sub pixel G is arranged between the signal line SL1 and the signal line SL2, the R is arranged between the signal line SL2 and the W(B), and the signal line SL3 is arranged between the W(B) and the signal line SL4. In other words, when the signal line SL2 is adjacent to the G, the signal line SL2 is arranged between the G and W(B). When the signal line SL2 is adjacent to the R, the signal line SL2 is arranged between the signal line SL1 and the R. Further, the signal line SL2 is arranged between the R and G, extending in a zigzag shape. The signal lines SL5 and SL8 are arranged similarly to the signal line SL2.

Modified Example

Figure 11:
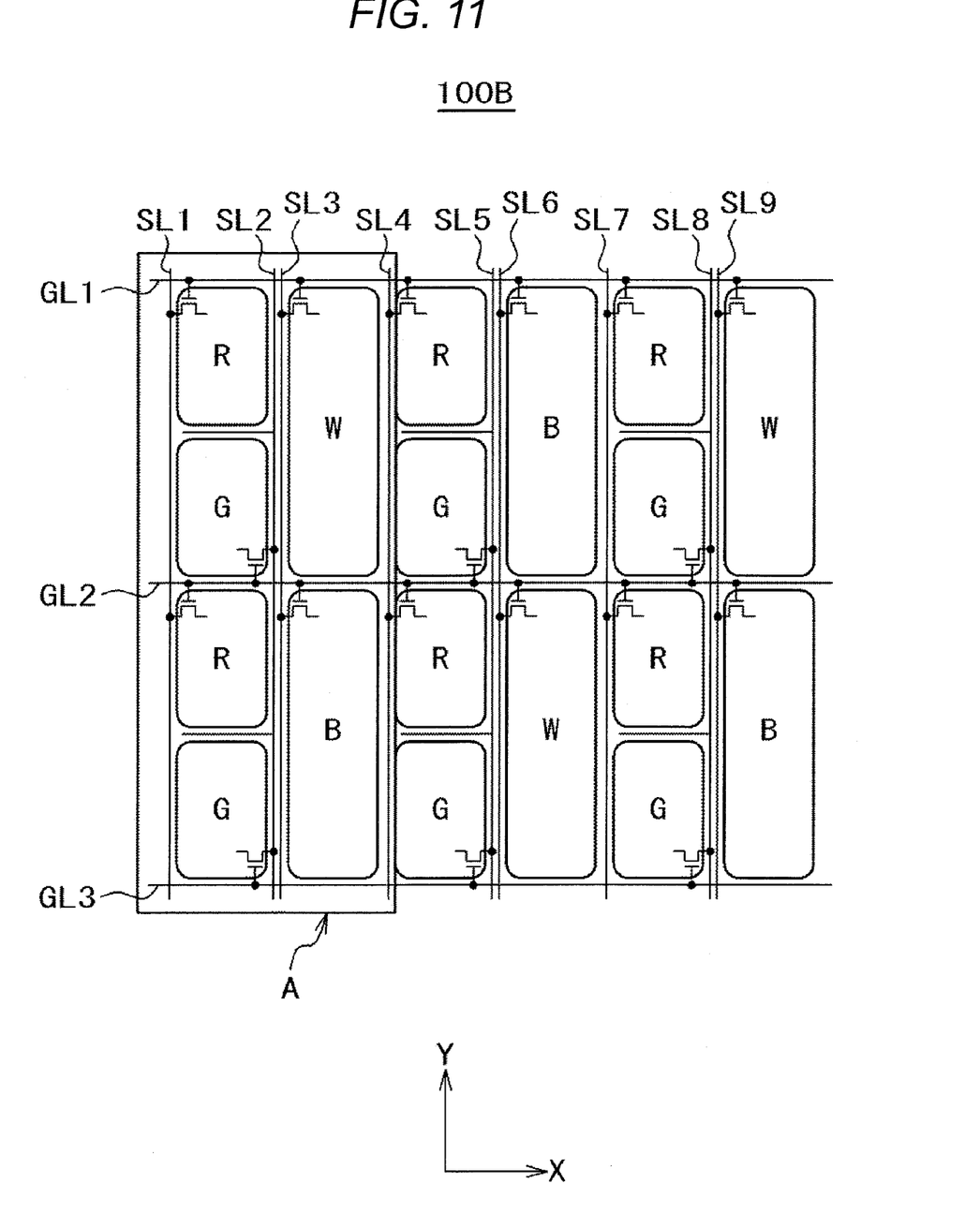
FIG. 11 is a top plan view for use in describing the display device according to the modified example.
Figure 12:
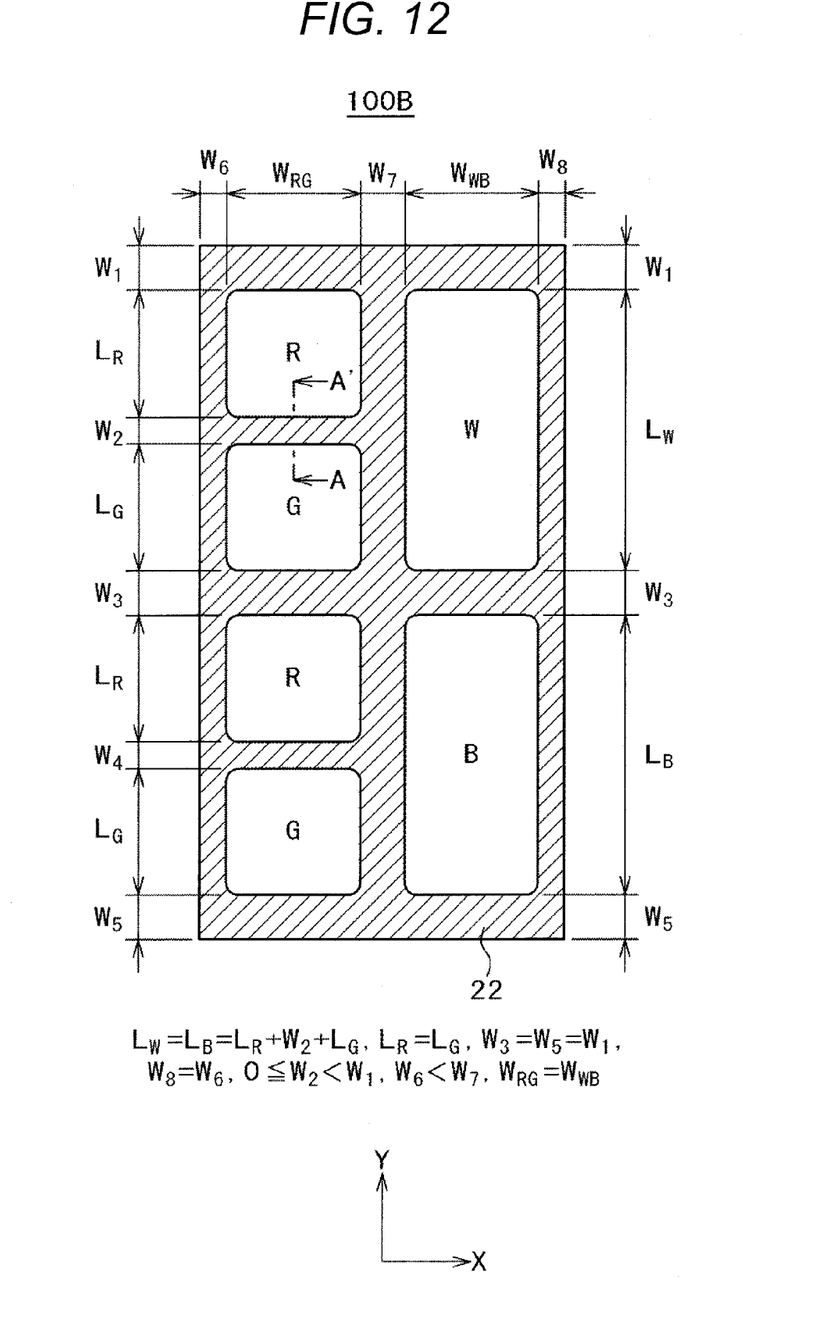
FIG. 12 is a top plan view for use in describing the display device according to the modified example.

A display device according to a modified example will be described using FIGS. 11 and 12. FIG. 11 is a top plan view for use in describing the arrangement of pixels, scanning lines, and signal lines in the display device according to the modified example. FIG. 12 is a top plan view illustrating an aperture pattern of sub pixels corresponding to the portion A of FIG. 11.

The arrangement of pixels, scanning lines, and signal lines in a display device 100B according to the modified example is basically the same as that in the display device 100S. Specifically, the sub pixel R is connected to the signal line SL1, the G is connected to the signal line SL2, and the W and B are connected to the signal line SL3. The R and G are arranged between the signal line SL1 and the signal line SL2, and the W and B are arranged between the signal line SL3 and the signal line SL4. In other words, the R arranged between the signal line SL1 and the signal line SL2 is connected to the signal line SL1, and the G arranged between the signal line SL1 and the signal line SL2 is connected to the signal line SL2. Further, in the display device 100B, the signal line SL2 connected to the G is branched and extended into a space between the R and G. The signal lines SL5 and SL8 connected to the G are similarly branched and extended. The cross-sectional view taken along the line A-A' of FIG. 11 is identical to FIG. 10.

The width of the black matrix 22 between the R and G of the first pixel and the width of the black matrix 22 between the R and G of the second pixel are defined as $W_2$ ($W_4=W_2$). The width of the black matrix 22 on the scanning line GL1 connected to the R and W of the first pixel and the width of the black matrix 22 between the first pixel and the second pixel, the width of the black matrix 22 on the scanning line GL3 connected to the G of the second pixel are defined as $W_1$ ($W_3=W_5=W_1$). Here, $W_2<W_1$. For example, $W_2=3$ μm and $W_1=9$ μm.

The width of the black matrix 22 between the W(B) and the R and G where one signal line SL1 is arranged is defined as $W_6$, the width of the black matrix 22 between the R and G and the W(B) where two signal lines SL2 and SL3 are arranged is defined as $W_7$, and the width of the black matrix 22 between the W(B) and the R and G where one signal line SL4 is arranged is defined as $W_6$ ($W_8=W_6$). Here, $W_7>W_6$. For example, $W_6=3$ μm and $W_7=5$ μm.

Other than the arrangement of the sub pixels and the signal lines (seventh signal line arrangement method) as illustrated in FIG. 11, the following arrangements of the sub pixels and the signal lines (eighth, ninth, and tenth signal line arrangement methods) may be applied.

(a) Eighth Signal Line Arrangement Method

The sub pixels R and G are arranged between the signal line SL1 and the signal line SL2 and the W and B are arranged between the signal line SL3 and the signal line SL4. The signal line SL1 connected to the R is branched and extended into the space between the R and G. The signal lines SL4 and SL7 connected to the R are similarly branched and extended.

(b) Ninth Signal Line Arrangement Method

The sub pixels R and G are arranged between the signal line SL1 and the signal line SL2 and the W and B are arranged between the signal line SL2 and the signal line SL3. The signal line SL2 connected to the G is branched and extended into the space between the R and G. The signal lines SL5 and SL8 connected to the G are similarly branched and extended.

(c) Tenth Signal Line Arrangement Method

The sub pixels R and G are arranged between the signal line SL1 and the signal line SL2 and the W and B are arranged between the signal line SL2 and the signal line SL3. The signal line SL1 connected to the R is branched and extended into the space between the R and G. The signal lines SL4 and SL7 connected to the G are similarly branched and extended.

What is claimed is:

1. A display device comprising
an array substrate,
an opposite substrate, and
a liquid crystal layer sandwiched by the array substrate and the opposite substrate, wherein
the array substrate includes
a first pixel formed by a red sub pixel, a green sub pixel, and a white sub pixel,
a second pixel formed by a red sub pixel, a green sub pixel, and a blue sub pixel,
a scanning line extending in a first direction,
a signal line extending in a second direction, and
first and second light shielding wiring layers,
the red sub pixel and the green sub pixel of the first pixel are arranged in the second direction,
the white sub pixel of the first pixel is arranged adjacently to the red sub pixel and the green sub pixel in the first direction,
the red sub pixel and the green sub pixel of the second pixel are arranged in the second direction,
the blue sub pixel of the second pixel is arranged adjacently to the red sub pixel and the green sub pixel in the first direction,
the first light shielding wiring layer is arranged between the red sub pixel and the green sub pixel of the first pixel in a way of extending in the first direction, and
the second light shielding wiring layer is arranged between the red sub pixel and the green sub pixel of the second pixel in a way of extending in the first direction,
wherein the scanning line includes first, second, and third scanning lines,
the first scanning line is connected to the red sub pixel and the white sub pixel of the first pixel,
the second scanning line is connected to the green sub pixel of the first pixel and the red sub pixel and blue sub pixel of the second pixel, and
the third scanning line is connected to the green sub pixel of the second sub pixel.

2. The display device according to claim 1,
wherein the signal line includes first, second, and third signal lines,
the first signal line is connected to the red sub pixels of the first and the second pixels,
the second signal line is connected to the green sub pixels of the first and the second pixels, and
the third signal line is connected to the white sub pixel of the first pixel and the blue sub pixel of the second pixel.

3. The display device according to claim 2, wherein the red sub pixel and the green sub pixel of the first pixel and the red sub pixel and the green sub pixel of the second pixel are arranged between the first signal line and the second signal line, and
the third signal line is arranged between the second signal line and the white sub pixel of the first pixel and the blue sub pixel of the second pixel.

* * * * *